US005664736A

United States Patent [19]

Murakoshi et al.

[11] Patent Number: 5,664,736

[45] Date of Patent: Sep. 9, 1997

[54] METHOD AND APPARATUS FOR FORMING LAMINATED COIL

[75] Inventors: Toshiichi Murakoshi, Neyagawa; Hiroshi Kawazoe, Hirakata, both of Japan

[73] Assignee: Matsushita Electric Industrial Co., Ltd., Osaka, Japan

[21] Appl. No.: 441,308

[22] Filed: May 15, 1995

[51] Int. Cl.$^6$ .............................. B65H 39/16; H01G 7/00

[52] U.S. Cl. ...................................... 242/444.2; 242/444.1; 83/917; 336/206

[58] Field of Search ................................ 242/7.09, 7.08, 242/444.2, 444.1; 83/917, 382; 336/206

[56] References Cited

U.S. PATENT DOCUMENTS

| | | | | |
|---|---|---|---|---|
| 1,111,289 | 9/1914 | Aylsworth | 336/206 | X |
| 3,570,356 | 3/1971 | Williams | 83/917 | X |
| 4,072,076 | 2/1978 | Miles | 83/917 | X |
| 4,573,382 | 3/1986 | Kloehn et al. | 83/917 | X |

FOREIGN PATENT DOCUMENTS

| | | | |
|---|---|---|---|
| 3539737 | 5/1987 | Germany | 336/206 |
| 112318 | 7/1983 | Japan | 242/7.08 |
| 22010 | 1/1989 | Japan | 242/7.08 |
| 290632 | 11/1990 | Japan | 83/917 |
| 2-61129 | 12/1990 | Japan . | |
| 7-66063 | 3/1995 | Japan . | |

*Primary Examiner*—Daniel P. Stodola
*Assistant Examiner*—Emmanuel M. Marcelo
*Attorney, Agent, or Firm*—Wenderoth, Lind & Ponack

[57] ABSTRACT

A laminated coil-forming method for winding wires and insulation films around a core, includes the steps of winding a first insulation film around an inner coil formed around the core, winding a second insulation film around the first insulation film with the second insulation film having a smaller width than a width of the first insulation film, and winding a third insulation film around the second insulation film with the third insulation film having a greater width than the width of the second insulation film before forming an outer coil.

11 Claims, 6 Drawing Sheets

METHOD AND APPARATUS FOR FORMING LAMINATED COIL

BACKGROUND OF THE INVENTION

The present invention relates to a method and an apparatus for forming a laminated coil, for use in electrical equipment and communication equipment, including a wire and insulation films wound around a core.

Laminated coils wherein a wire for coil and insulation films are wound around a core are used in flyback transformers for use in cathode-ray tubes or the like.

An example of a conventional laminated coil is described below with reference to FIG. 4. An insulation film 3 of polyester is wound in a layer around a core 2. A wire 20 of copper is coiled around the insulation film 3 in a range by providing a predetermined gap at each of the lengthwise edges of the insulation film 3 therefrom to form an inner coil 21. Other insulation films 3 are wound in three layers around the inner coil 21. The wire 20 is coiled around the three layer's insulation films 3 in the above-described manner to form an outer coil 22. An insulation film 3 is wound in a layer around the outer coil 22. Then, the assembled body is sealed with resin.

FIGS. 5 and 6 show a conventional laminated coil forming apparatus, for example, disclosed in the examined Japanese Patent Publication No. 2-61129, which can carry out the above operations. A frame 44 is rotatably mounted on a machine base 41 via a bracket 43. Two spindles, first spindle 45*a* and second spindle 45*b* are projected from the frame 44 on both sides thereof in directions perpendicular to a rotary axis of the frame 44. Each of spindles 45*a* and 45*b* holds the core 2 as the core holding means 1. The frame 44 is intermittently rotated by 180 degrees by a driving device 46 in the same direction or a normal and reverse directions. Each of spindles 45*a*, 45*b* are rotated by a servo motor or pulse motor while holding the core 2. A wire winding mechanism 47 is located on the base 41 with the mechanism 47 opposed to the first spindle 45*a* of the core holding means 1 in FIGS. 5 and 6. A bracket 49 the mechanism 47 can move in horizontal and vertical directions on a base 48 of the base 41. The bracket 47 has at its leading end a nozzle 50 for supplying the wire. The wire is supplied to the nozzle 50 after a tensile force is applied by a tensile force adjusting mechanism (not shown) to the wire supplied from a bobbin 72 around which the wire is wound. Reference numeral 51 is an insulation film supply device. The device 51 includes a holding device 52 of a reel 74 around which the insulation film 3 is wound, rollers 53 for guiding the film 3 to a predetermined position, screw shafts 54 located in the vertical direction via a gap therebetween, a bracket 56 supported on the screw shafts 54 and movable in the vertical direction and pivotable in the back and front directions, chucks 57 mounted on the bracket 56 for holding the film 3, and a driving device 55 for reversely rotating the screw shafts 54.

Reference numeral 58 denotes an insulation film winding mechanism arranged at a position where the second spindle 45*b* is opposed to the mechanism 58. The mechanism 58 includes a winding device 60 for winding the film 3 around the core 2, an adhering device 61 for temporarily adhering the leading and trailing ends of the film 3 to the core 2, and a cutting tool 59 for cutting the film 3 in a predetermined length.

In such a device, firstly, the insulation film 3 is wound around the core 2 held by the second spindle 45*b* in FIGS. 5 and 6 by the film supply device 51 and then, the frame 44 is rotated by the driving device 46 by 180 degrees to oppose the core 2 held by the second spindle 45*b* to the wire winding mechanism 47. Then, the wire 20 is wound by the wire winding mechanism 47 around the core 2 held by the second spindle 45*b*. Then, after the wire winding is completed on the core 2 of the second spindle 45*b*, the frame 44 is again rotated by 180 degrees by the driving device 46 so that the core 2 held by the second spindle 45*b* is subjected to the insulation film winding operation. That is, the insulation films 3 are fed by the film supplying device 51 around the core 2 held by the second spindle 45*b*. During the film and wire winding operations, the core 2 held by the first spindle 45*a* is also subjected to the same operations. In such operations, the two laminated coils are simultaneously obtained in the device.

In the laminated coil, however, an insulation distance shown by a broken line 23 between the lengthwise edge of the inner coil 21 and that of the outer coil 22 is short. Thus, the laminated coil has an undesirable insulation characteristic.

SUMMARY OF THE INVENTION

An object of the present invention is to provide a laminated coil-forming method and apparatus capable of winding insulation films having different widths around an inner coil wound around an underlayer insulation film wound around a core, without replacing film reels or film supply devices with each other.

In accomplishing these and other objects, according to one aspect of the present invention, there is provided a laminated coil-forming method for winding wires and insulation films around a core, including steps of: winding a first insulation film around an inner coil formed around the core; winding a second insulation film around the first insulation film with the second insulation film having a smaller width than a width of the first insulation film; and winding a third insulation film around the second insulation film with the third insulation film having a greater width than the width of the second insulation film before forming an outer coil.

According to another aspect of the present invention, there is provided a laminated coil-forming apparatus including: a core holding means for holding a core; a wire winding means for winding wires around the core; an insulation film winding means for winding insulation films around the core; and a cutting means for cutting a width of the insulation film so that when an insulation film is fed as an intermediate layer of three insulation films positioned between inner and outer coils, the width of the fed insulation film is cut so as to be shorter than a width of other insulation film, the cutting means being located near where the insulation film is fed to the core.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
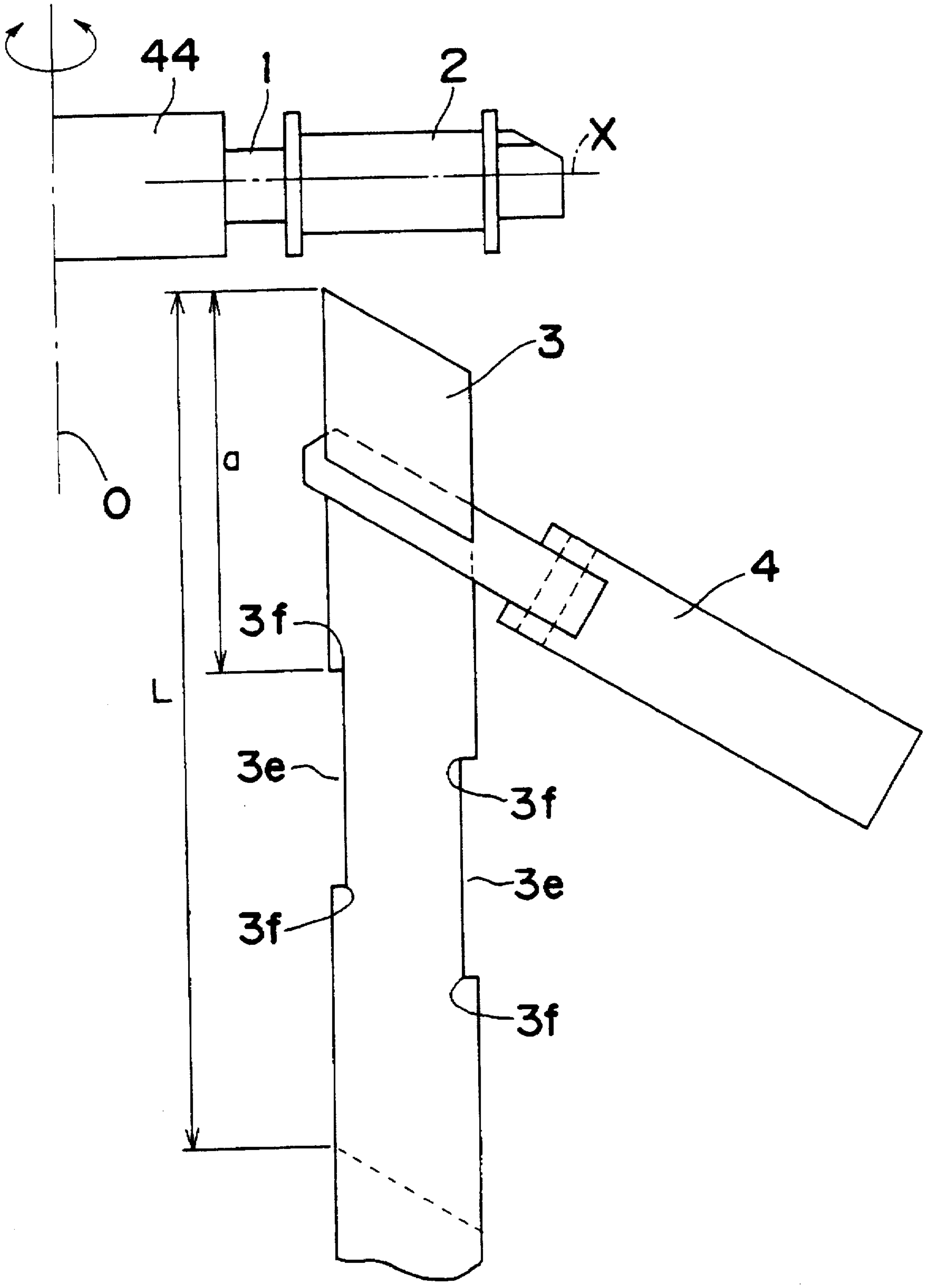
FIG. 1 is a front view showing principal portions of a laminated coil-forming apparatus according to an embodiment of the present invention.

Before the description of the present invention proceeds, it is to be noted that like parts are designated by like reference numerals throughout the accompanying drawings.

Figure 5:
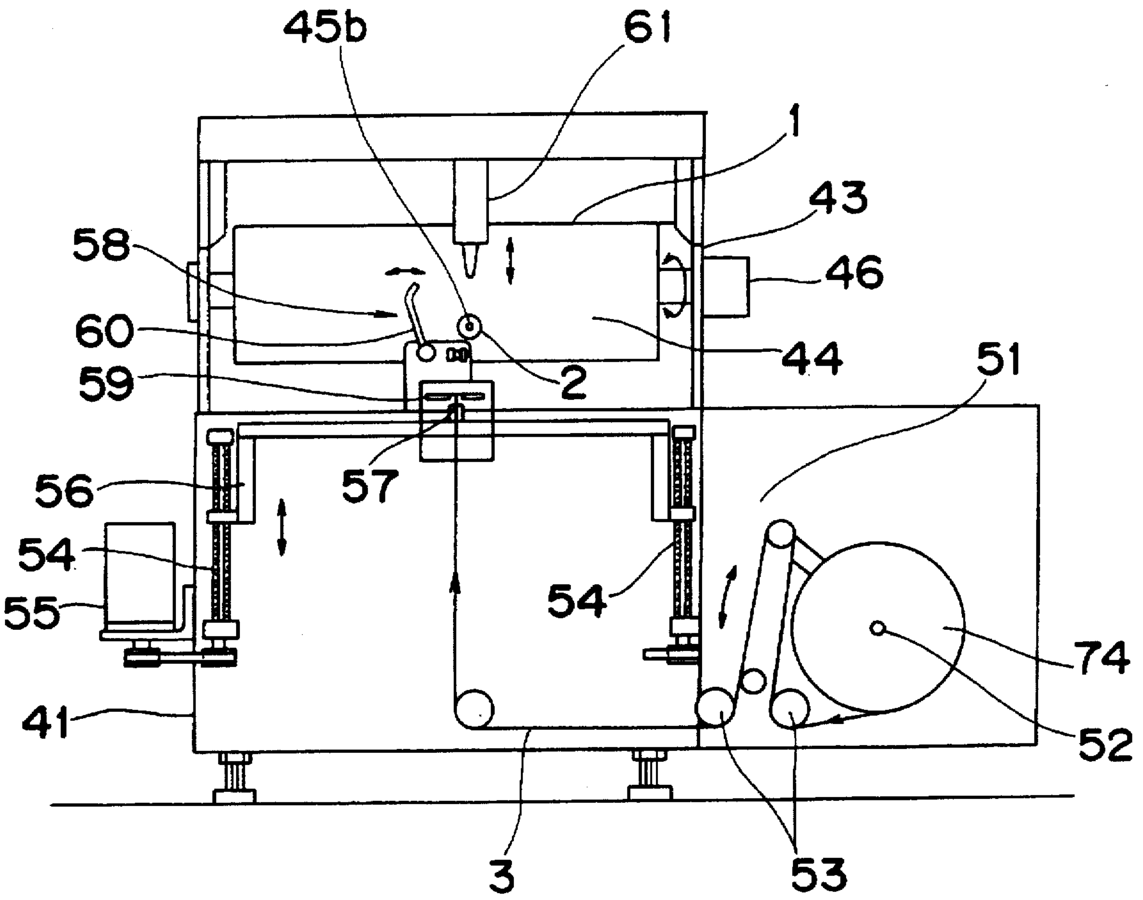
Fig. 5 PRIOR ART
FIG. 5 is a schematic front view of a conventional laminated coil-forming apparatus.
Figure 6:
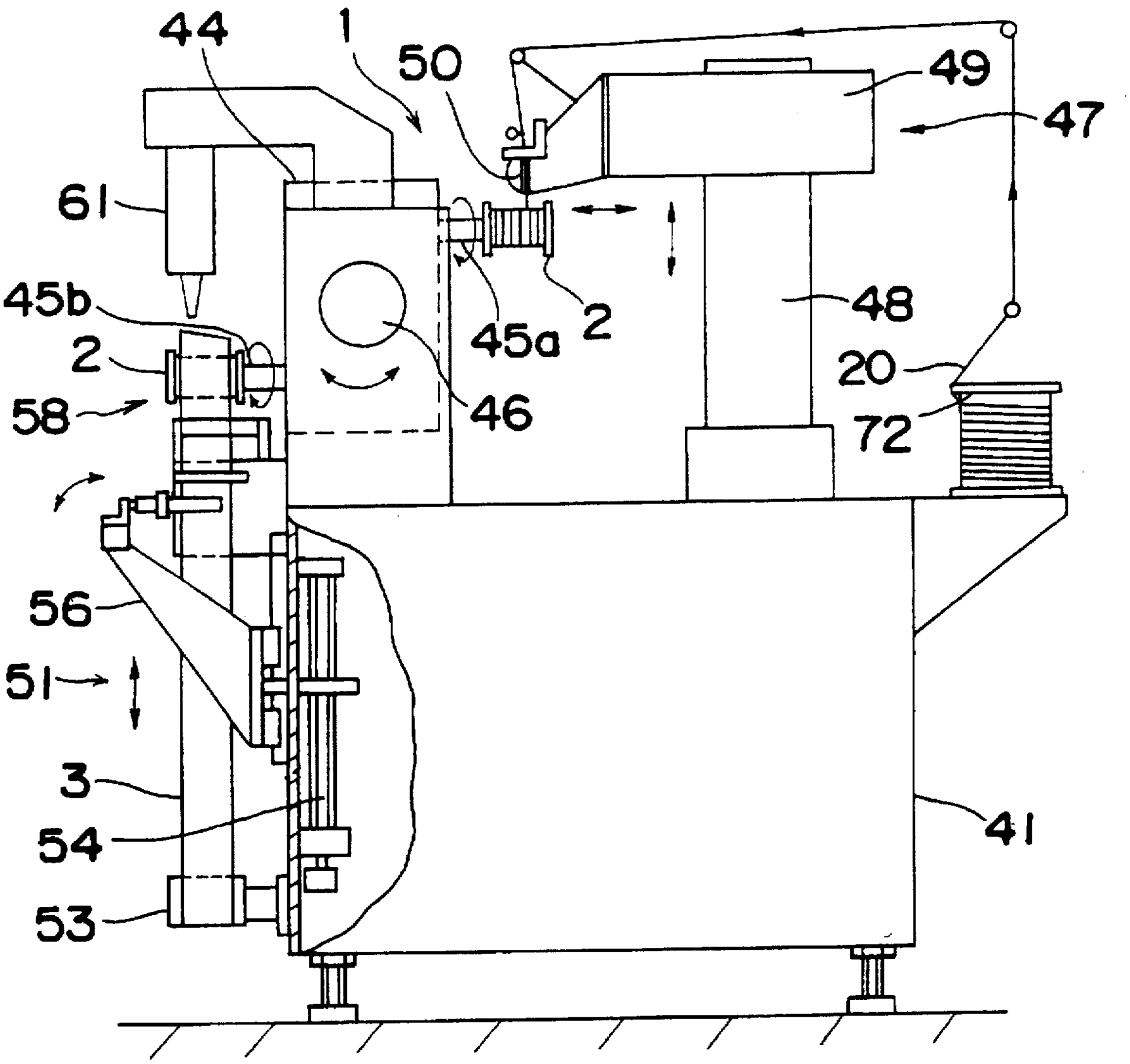
Fig. 6 PRIOR ART
FIG. 6 is a schematic side view of the apparatus in FIG. 5.
Figure 7:
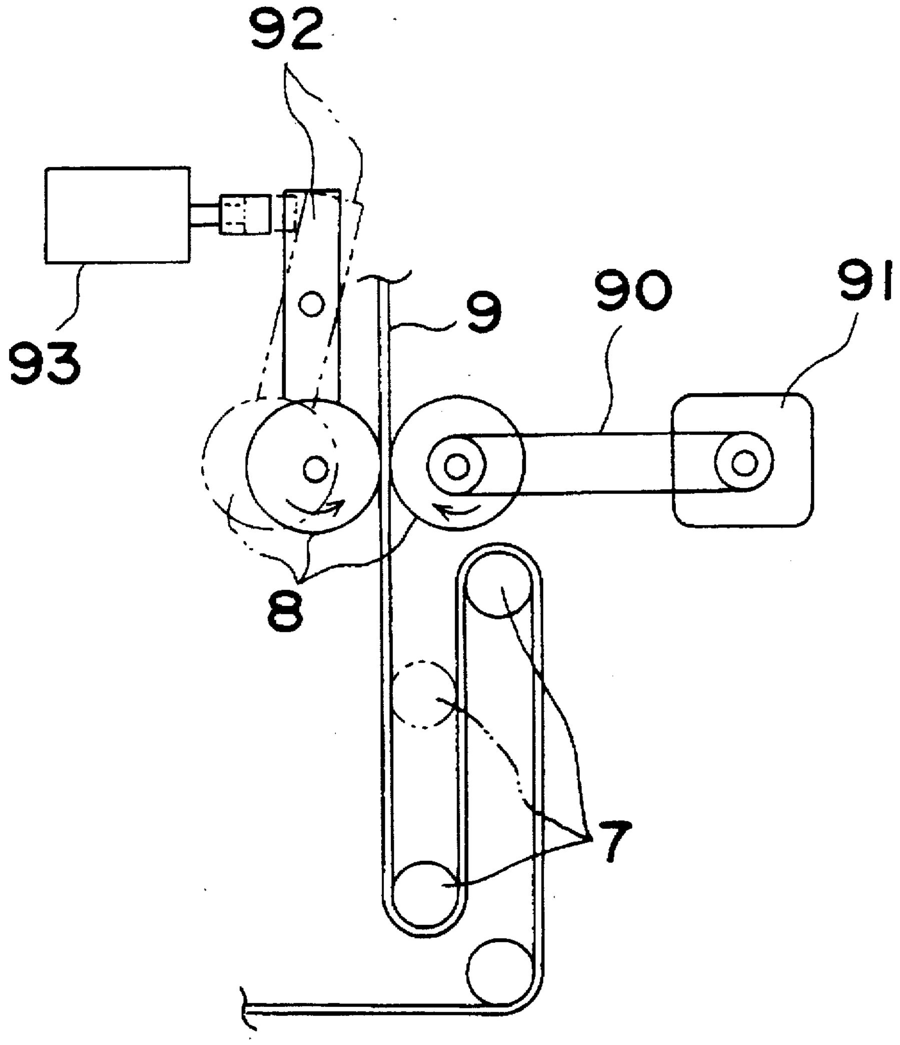
FIG. 7 is an enlarged and partial side view in vertical section showing the insulation film-winding means of FIG. 2.

An apparatus for forming a laminated coil according to an embodiment of the present invention and the operation of the apparatus are described below with reference to FIGS. 1, 2, and 7. In the apparatus according to the embodiment, the wire winding mechanism 47 in the conventional laminated coil-forming apparatus in FIGS. 5 and 6 can be applied to the apparatus according to the embodiment while the film supply device 51 is replaced with that in FIG. 2.

Referring to FIG. 1, the apparatus includes a core holding means 1 which is rotatable around an axis (X) by the driving device 46 (see FIGS. 5 and 6) comprising such as a servo motor and pivotal in a range of 180° on a pivotal axis (O). At one end of the pivotal range of the core holding means 1, an insulation film 3, for example, made of polyester is wound around a core 2 by an insulation film winding means 5 shown in FIG. 2 while at the other end of the pivotal range, wires 20 are coiled around the insulation film 3 by the wire winding mechanism 47. The apparatus further comprises a pair of air scissors 4, which is driven by an air cylinder, for cutting the insulation film 3 in accordance with the amount thereof to be wound around the core 2.

Figure 2:
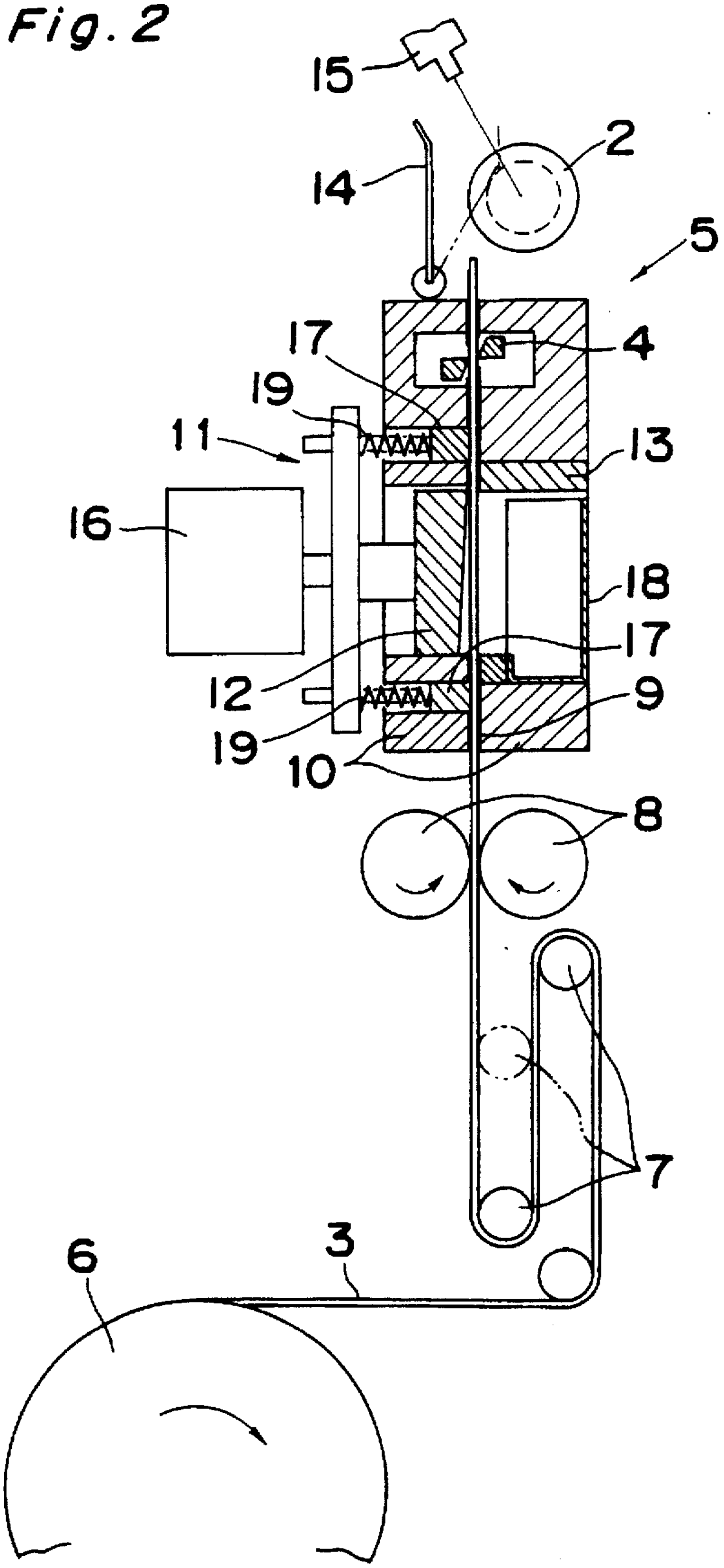
FIG. 2 is a side view partly in vertical section showing an insulation film-winding means according to the embodiment of the present invention.

Referring to FIG. 2, the insulation film winding means 5 comprises a plurality of tension rollers 7 for applying a predetermined tensile force to an insulation film 3 drawn out from a film reel 6 by using a dead weight of one of the rollers 7. Also, includes is a pair of feeding rollers 8 which is rotated by a driving means 91 through a timing belt 90 (see FIG. 7) to feed the insulation film 3 toward the core 2. The driving means 91 may be a pulse motor or the like. A guide 10 is provided is and a gap 9, the width and thickness of which are a little greater than those of the insulation film 3. Also provides is means 11, comprising a punch 12 and a die 13, for cutting the insulation film 3 in the lengthwise direction thereof at required times while the insulation film 3 is being guided by the guide 10. A film pressing member 14, which is constituted by a leaf spring, is provided for pressing the insulation film 3 against the core 2, and an ultrasonic wave horn 15 is provided for welding the ends of the insulation film 3 to the core 2. The punch 12 cuts both lengthwise edges of the insulation film 3 so as to shorten the width of the insulation film 3 as shown by reference numerals 3*e* in FIG. 1. The cut configuration is not limited to the rectangle in FIG. 1 but may have such a configuration that corners 3*f* are round. The longitudinal distance of the cut portion 3*e* preferably has a length by which the insulation film 3 is wound in one layer around the core 2.

The cutting means 11 further includes a punch driving cylinder 16 for driving the punch 12; rectangular film holding blocks 17 for holding the insulation film 3 when the insulation film 3 is cut; and a waste container 18 for accommodating cut waste of the insulation film 3. The film holding blocks 17 are moved toward the guide 10 by the punch driving cylinder 16 via springs 19. In cutting the insulation film 3, the insulation film 3 is placed in position by the film holding blocks 17 while the film holding blocks 17 and the guide 10 are holding the insulation film 3 and then, cut by the punch 12 by further driving the driving cylinder 16.

The operation of the apparatus having the above-described construction is described below. The insulation film 3 is supplied from the film reel 6 to the tension rollers 7 and thus a predetermined tensile force is applied to the supplied insulation film 3. Then, a specified amount (L) of the insulation film 3 is fed toward the core 2 by the feeding rollers 8 through the gap 9 of the guide 10 against the predetermined tensile force applied to the insulation film 3. In winding the insulation film 3 around the core 2, when the leading end of the insulation film 3 has been fed to the core 2, the leading end of the insulation film 3 is welded to the core 2 by means of the ultrasonic wave horn 15, with the leading end of the insulation film 3 pressed against the core 2 by the film pressing member 14. Then, as shown in FIG. 7, a driving device 93 such as a cylinder is driven to press and pivot a lever 92 supporting a rotary shaft of one of the feeding rollers 8 and thus one of the feeding rollers 8 is moved away from the other of the feeding rollers 8 to allow the insulation film 3 to pass therethrough and at the same time, the core 2 is rotated by the core holding means 1. Consequently, the insulation film 3 is wound around the core 2 while the predetermined tensile force is being applied to the insulation film 3. The insulation film 3 is cut by the air scissors 4 when a predetermined amount thereof is wound around the core 2. When the trailing end of the insulation film 3 has reached the core 2, the trailing end of the insulation film 3 is welded to the core 2 by the ultrasonic wave horn 15 to complete the operation for winding the insulation film 3 around the core 2 as the underlayer insulation film 3.

Figure 3:
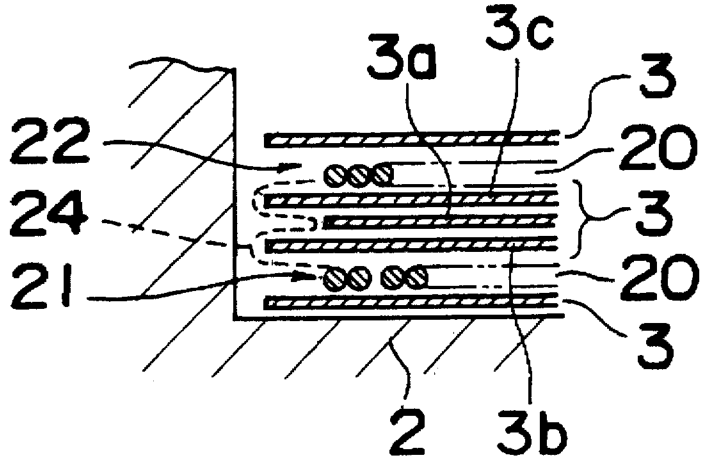
FIG. 3 is an illustration showing the construction of a principal portion of a laminated coil to be formed in the embodiment of the present invention.
Figure 4:
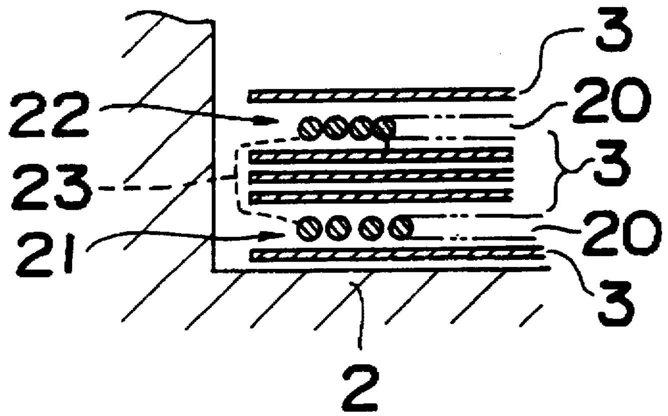
Fig. 4 PRIOR ART
FIG. 4 is a view showing the construction of a principal portion of laminated coil to be formed according to a conventional method.

It is supposed that the insulation film 3 is wound in three or more layers (here, three layers in the embodiment) after the inner coil 21 is wound around the underlayer insulation film 3 as shown in FIG. 3. Then, the insulation film 3 is fed to the core 2 in the same manner as described above and fixedly wound around the inner coil 21 as the inner layer 3*b* of the insulation film 3. The underlayer 3 and inner layer 3*b* of the insulation films 3 are not cut by the cutting means 11. When a portion of the insulation film 3 corresponding to an intermediate layer 3*a* of the three layer's insulation films 3 is located at the position of the cutting means 11, the punch driving cylinder 16 is actuated to cut the portion of the insulation film 3 corresponding to the intermediate layer 3*a* so that the width of the intermediate layer 3*a* is smaller than that of the inner layer 3*b*. In the cutting operation, before the punch 12 cuts the insulation film 3, the film holding blocks 17 place the insulation film 3 in position while the film holding blocks 17 and the guide 10 are holding the insulation film 3. Then, the insulation film 3 is fed to the core 2 in the same manner as described in regard to the inner layer 3*b* of the insulation film 3 and fixedly wound around the intermediate layer 3*a* as the outer layer 3*c* of the insulation film 3. The outer layer 3*c* of insulation film 3 is not cut by the cutting means 11. Then, the coil 20 is wound around the outer layer 3*c* of the insulation film 3 to form an outer coil 22 and then, an outer insulation film 3 is wound around the outer coil 22 without cutting by the cutting means 11. Thus, since the intermediate layer 3*a* has a smaller width than that of each of the inner and outer layers 3*b* and 3*c* of the insulation films 3, the insulation distance shown by a broken line 24 in FIG. 3 and formed between the intermediate, inner, and outer layers 3*a*, 3*b*, and 3*c* of the insulation films 3 becomes longer.

The cutting operation of the insulation film 3 is controlled by a known controller through a program. That is, a specified feeding amount (a) of the insulation film 3 is determined in the program and after the feeding amount (a) of the insulation film 3 is fed, the feeding of the insulation film 3 is stopped and the film 3 is cut by the cutting means 11 to form the intermediate, inner, and outer layers 3*a*, 3*b*, and 3*c* of the insulation films 3, respectively. The timing of the cutting operation of the insulation film 3 by the air scissors 4 is determined by a film feeding amount (L) of the insulation film 3. Such feeding amounts (a) and (L) of the insulation film 3 is controlled by the rotation number (pulse number) of the pulse motor 91.

As is apparent from the above description, the insulation film 3 has the portion having the greater width and corresponding to the inner and outer layers 3*b*, 3*c* and the portion having the smaller width and corresponding to the intermediate layer 3*a* and integral with the portions corresponding to the inner and outer layers 3*b*, 3*c*. In order to form the intermediate layer 3*a* on the inner layer 3*b*, the portion of the insulation film 3 corresponding to the intermediate layer 3*a* is cut so that the width of the intermediate layer 3*a* is smaller than that of ends of the inner and outer layers 3*b*, 3*c* while the insulation film 3 is being fed toward the core 2. Thus, it is unnecessary to perform a film reel-replacing operation to replace a reel on which the insulation film 3 having the greater width has been wound with a reel on which the insulation film 3 having the smaller width has been wound in one film supply device, or switch a film supply device having a reel on which the insulation film 3 having the greater width has been wound with a film supply device having a reel on which the insulation film 3 having the smaller width has been wound and vice versa. Moreover, the operation for winding the insulation films 3 around the inner coil 21 wound on the underlayer insulation film 3 can be efficiently accomplished to provide the laminated coil having a long insulation distance. Further, in winding the insulation film 3 in four or more layers around the inner coil 21, it is necessary to weld only the leading and trailing ends of the insulation film 3 to the core 2. Therefore, the wound insulation film 3 has a smooth surface so long as the surface of the core 2 is smooth. Therefore, the inner and outer coils 21, 22 wound on the insulation film 3 have also a smooth surface, respectively.

In the embodiment, the configuration of the film holding block 17 is not limited to rectangle, but may be circular. The laminated coil is not limited to FIG. 3 but may comprise two sets of the inner, intermediate, and outer layers of the insulation film.

According to the laminated coil-forming method of the present invention, as described above, in laminating the insulation film in three or more layers one on the other around the core via the inner coil wounds around the underlayer insulation film, the portion of the insulation film corresponding to the intermediate layer is cut so that the width of the intermediate layer is smaller than that of the inner and outer layers thereof while the insulation film is being fed toward the core. Thus, the operation of winding the insulation film around the inner coil can be efficiently accomplished in order to provide the laminated coil with a long insulation distance, without the necessity of replacing film reels or film supply devices. Further, it is necessary to weld only the leading and trailing ends of the insulation film to the core. Therefore, the wound insulation film has a smooth surface so long as the surface of the core is smooth. Therefore, the inner and outer coils wound on the insulation film have also a smooth surface, respectively. Thus, the method according to the present invention is capable of mass-producing the laminated coil at a high production rate.

Further, according to the laminated coil-forming apparatus of the present invention, because the cutting means is provided on the supply path of the insulation film, the portion of the insulation film corresponding to the intermediate layer is cut so that the width of the intermediate layer is smaller than that of the inner and outer layers thereof immediately before the portion of the insulation film corresponding to the intermediate layer is wound around the inner layer thereof. Thus, one insulation film can be laminated in a plurality of widths, one on the other around the core, without the necessity of replacing film reels or film supply devices.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A laminated coil forming method comprising:

feeding an insulation film toward a core;

winding an insulation film around the core to form an underlayer;

winding wires on the underlayer to form an inner coil;

winding a first portion of the insulation film around the inner coil on the core;

cutting a second portion of the insulation film, said cutting being performed during said step of feeding, so that the width of the second portion is less than the width of the first portion;

winding the second portion of the insulation film around the first portion of the insulation film; and winding a third portion of the insulation film around the second insulation film, wherein the third portion forms an outer layer which has a width greater than the width of the second portion.

2. The laminated coil forming method as claimed in claim 1, wherein the first, second, and third portions of the insulation film are fed from a single supply of insulation film having a uniform film width.

3. The laminated coil forming method as claimed in claim 1, further comprising:

winding wires around the third insulation film portion, after the step of winding the third portion, to form an outer coil; and winding an insulation film portion around the outer coil.

4. The laminated coil forming method as claimed in claim 3, wherein the first, second, and third portions of the insulation film are fed from a single supply of insulation film having a uniform film width.

5. A laminated coil forming apparatus comprising:

a core holding means for holding a core;

a wire winding means for winding wires around the core; and an insulation film winding means for winding insulation film around the core, said insulation film winding means including a cutting means for cutting a portion of insulation film, corresponding to an intermediate layer of three insulation layers, to reduce the width of the portion of the insulation film, wherein said core holding means and said insulation film winding means define a film transfer path, and said cutting means is positioned along the film transfer path adjacent said core holding means.

6. The laminated coil-forming apparatus as claimed in claim 5, further comprising a single supply of insulation film having a constant width.

7. A laminated coil-forming apparatus as claimed in claim 5, wherein said cutting means comprises:

an insulation film holding means for holding insulation film in a cutting position;

a film guide means for guiding insulation film into said insulation film holding means;

a punch for cutting the width of an insulation film held by said holding means; and a driving means for driving said holding means and said punch.

8. The laminated coil-forming apparatus as claimed in claim 7, further comprising a single insulation film supply means for supplying an insulation film having a constant width.

9. A laminated coil-forming apparatus comprising:

a support base;

an insulation film supply reel mounted within said support base;

a pair of insulation film feeding rollers mounted on said support base in the vicinity of said film supply reel;

a frame supported on said support base;

a core mounting spindle projecting from said frame;

a wire winding mechanism for winding wires around the core;

an insulation film cutter mounted on said support base between said pair of feeding rollers and said spindle, said insulation film cutter having a guide passage for receiving insulation film from said pair of feeding rollers, wherein said cutter is operable to reduce the width of a length of insulation film.

10. The laminated coil-forming apparatus as claimed in claim 9, wherein said insulation film cutter comprises:

a pair of holding blocks for engaging the insulation film;

a film cutting punch; and a driving cylinder connected to said cutting punch.

11. The laminated coil-forming apparatus as claimed in claim 10, wherein said cutter further comprises a support element connected to said holding blocks and said cutting punch, wherein said support element is driven by said driving cylinder, and said holding blocks engage the insulation film before said cutting punch cuts the insulation film.

* * * * *